Patented Jan. 1, 1929.

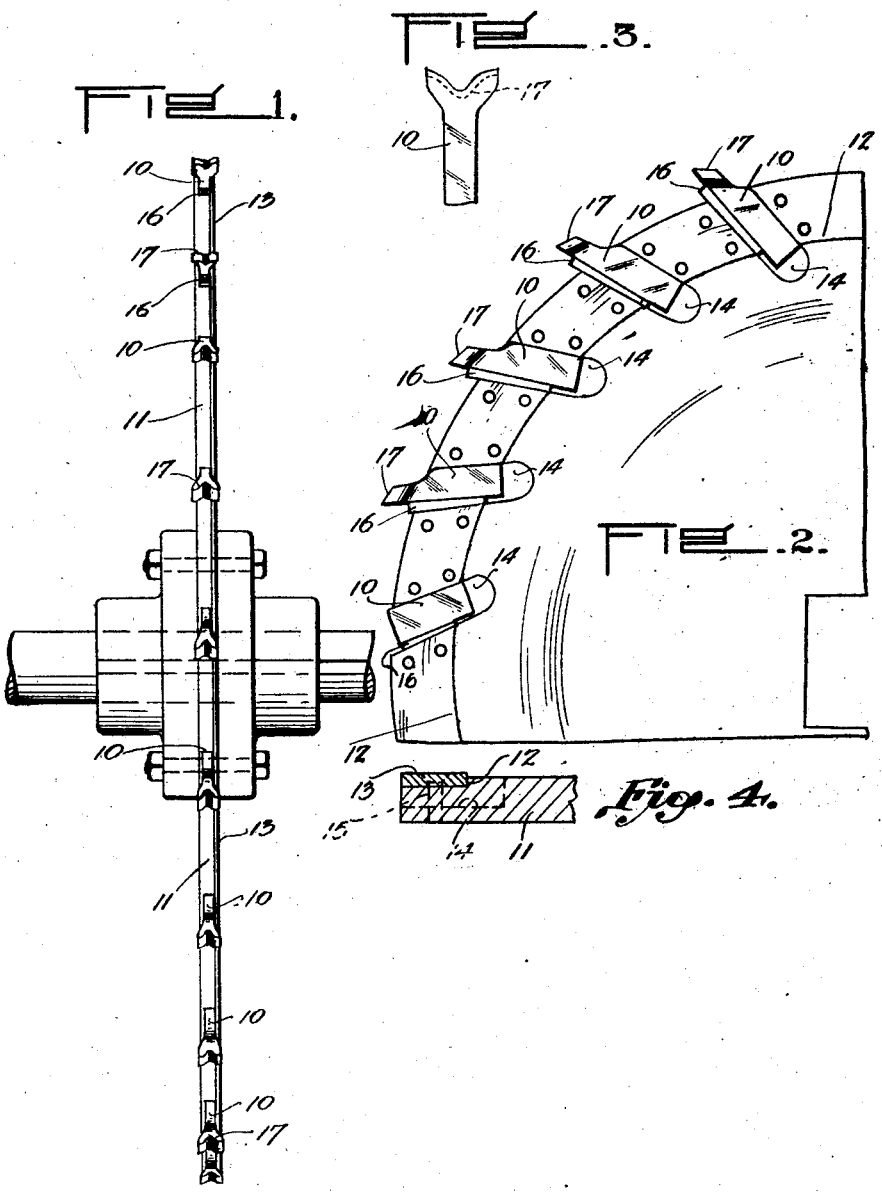

1,697,116

UNITED STATES PATENT OFFICE.

GEORGE OLIVER HAYWARD, OF GOSFORD, NEW SOUTH WALES, AUSTRALIA.

STONE-CUTTING CIRCULAR SAW.

Application filed March 3, 1927, Serial No. 172,497, and in Australia June 18, 1926.

Stone cutting circular saws are known but these have hitherto been driven at a high speed and the teeth have been comparatively close together. It is also known to construct stone cutting circular saws with removable carborundum teeth but in this case too, the teeth have been comparatively close together and the saws driven at a high speed.

In operation the action of the saws referred to above is abrasive but the action brought about by the use of my invention is such that each tooth digs into the stone and then pushes against or ploughs a portion to be removed.

Constructed according to my invention a number of teeth or cutters are secured around the periphery of a disc at comparatively long, but preferably equal distances apart. There are many ways by which each cutter or tooth may be secured to the disc, but one simple method has been selected in order to describe and illustrate my invention.

I have found that by driving a stone cutting saw constructed according to my invention at a circumferential speed of about 400 feet per minute the cutting speed is very greatly increased as compared with the cutting speed of any known stone cutting saw. For example a saw constructed according to this invention will cut at the rate of 300 feet per hour whereas the best results obtainable from other known makes of saws is 36 feet per hour. These figures refer to a block of stone the vertical thickness of which is two feet.

The invention will however be more readily understood by referring to the accompanying sheet of drawings in which—

Figure 1 is a front elevation of the saw fixed upon a shaft.

Figure 2 is a side view of a segmental portion of the saw with the ring, which forms one side of the tool or cutter boxes, removed from the disc.

Figure 3 is an enlarged front view of portion of a cutter.

Fig. 4 is an enlarged fragmentary sectional detail through the outer portion of the disc showing the means for securing the cutters in position thereon.

The teeth or cutters 10 of the saw may be secured to the disc 11 in various ways but the method illustrated in the drawings is simple and efficient. It consists of the disc 11 upon one side of which is a flat annular recess 12 extending from its periphery inwardly for a suitable distance in order to form a shouldered seating for the metal ring 13. Around the periphery of the disc 11 are a number of spaced recesses 14 which extend inwardly therefrom at a suitable angle to a line that is radial to the disc and which passes through each recess. Each of these recesses 14 extend inwardly beyond the inner edge of the annular recess 12 so that when the ring 13 is secured in position, by the rivets or countersunk screws 15, the inner ends of the recesses 14 are all exposed in order that when necessary, each or any of the cutters 10 may be forced out of the respective recesses by striking the rear end of the cutter 10 with a tool or tools. When the ring 13 is fixed in position the recesses 14 each form a box with open ends, the ring itself forming one side of the boxes, and in each box thus formed the shank of a cutter 10 is inserted longitudinally and securely fastened therein by means of a wedge 16. It is important to note that the recesses must be formed so that when the cutters are secured in position they will not lie in a line radial with the disc 11 because if they are so placed the sides and not the points of the tool will strike the stone as the disc rotates.

There are various shapes that might be adopted for the formation of the teeth or cutters but it is essential that they shall be so formed that the incision made shall provide a clearance to enable the disc or a portion thereof to pass therethrough without making frictional contact therewith. In the preferred form of tooth or cutter illustrated at Figures 2 and 3 the cutting end is shaped to form a V the rear side of which is bevelled at 17 whilst the extremities of the V form points which project beyond the respective sides of the disc. It will be seen that the thickness of the disc is somewhat increased by the ring so that allowance will be made for this additional thickness when determining the actual distance between the points of the teeth or cutters.

Certain teeth may be somewhat differently shaped to remove any core that may remain owing to the V shaped formation of the teeth or cutters. This is so obvious however that it has not been considered necessary to illustrate a cutter in the accompanying drawings.

The circular saw will be rigidly secured to a shaft adapted to be driven at a slow speed and any known means may be adopted to cause the stone to be fed to the saw or vice versa.

Although satisfactory results will be obtained with a saw constructed according to the foregoing description I do not wish to confine myself to that particular construction as it is obvious that other equally efficient means may be designed for the purpose of removably securing the teeth or cutters to the disc.

Whilst I have specified a slow speed it may be possible to obtain a specially hardened steel from which the cutters may be formed and in that case the saw could be driven at a far greater speed.

I claim—

A stone cutting saw comprising a disk having an annular recess extending around a side at the periphery thereof, said disk also having in its periphery a series of sockets in spaced relation extending inwardly beyond said annular recess, said sockets being closed on one side and open on the other side to said recess, a ring seated in the annular recess in abutting relation to the annular shoulder at the inner side of the recess and partly closing the open sides of the sockets, cutters seated in the sockets to project from the periphery of the disk and with their inner ends spaced from the inner ends of the sockets, and means for holding the cutters in the sockets.

In testimony whereof, I have this 31st day of January, A. D. 1927, signed my name to this specification.

GEORGE OLIVER HAYWARD.